Jan. 2, 1962 H. E. TRACY 3,015,506
MULTI-STEP MECHANICAL SEAL
Filed March 17, 1958 2 Sheets-Sheet 1

INVENTOR.
HERBERT E. TRACY
BY
Allen E. Hambley
ATTORNEY

Jan. 2, 1962 H. E. TRACY 3,015,506
MULTI-STEP MECHANICAL SEAL
Filed March 17, 1958 2 Sheets-Sheet 2

INVENTOR.
HERBERT E. TRACY
BY
ATTORNEY

United States Patent Office

3,015,506
Patented Jan. 2, 1962

---

3,015,506
MULTI-STEP MECHANICAL SEAL
Herbert E. Tracy, Alhambra, Calif., assignor to Borg-Warner Corporation, Chicago, Ill., a corporation of Illinois
Filed Mar. 17, 1958, Ser. No. 722,077
11 Claims. (Cl. 286—11.14)

The present invention relates to mechanical seals, and more particularly to a mechanical seal which is adapted to seal a pump or other rotary shaft against leakage of high pressure fluids.

Heretofore, mechanical seals have proven to be ineffective in applications where relatively high pressures are encountered; that is, pressures on the order of 1,500 p.s.i. and above. Sealing of such high pressures has been accomplished by the use of tandem seals, whereby the high pressure is broken down into a plurality of stages so that if the pressure being sealed against were on the order of 2,500 p.s.i. then two seals could be employed, with each seal being subjected to a pressure of approximately 1,250 p.s.i. However, such a construction requires substantial space for installation of the multi-stage or tandem seal assembly inasmuch as the seals are spaced axially along the shaft. In installations where such space is not available, efforts to employ a single-stage seal have been unsuccessful, since the seals when subjected to such high pressures have had a very short life, the seal faces scoring and binding after relatively few hours of operation.

A primary object of the present invention is to provide a mechanical seal capable of effectively sealing against high pressures such as heretofore have required the use of a plurality of mechanical seal assemblies in tandem.

In accordance with the preceding object, the present invention contemplates a single seal which requires a minimum of space to enable its installation, but wherein the pressure being sealed is partially counterbalanced.

It is well known in the mechanical seal field that when a seal is properly functioning there is a pressure gradient across the relatively rotating seal faces from the housing pressure to atmosphere. Accordingly, at an intermediate annular area across the seal faces the pressure will be at an unknown value, approximately one-half of the housing pressure. The present invention avails of this characteristic of mechanical seals and contemplates the provision of means for imposing a predetermined fixed intermediate balancing fluid pressure between the sealing faces intermediate the peripheries of the sealing rings. If the intermediate pressure be one-half of the housing pressure and such intermediate pressure be imposed in an annulus between inner and outer radially spaced, relatively narrow seal faces on one of the seal rings, then this intermediate pressure will cancel out one-half of the housing pressure across one of the relatively narrow sealing faces, leaving only one-half of the housing pressure to be sealed across the other relatively narrow face. Thus, a seal embodying the present invention may be characterized as a multi-step seal. In the illustrative embodiment, a two-step seal is shown but it will be apparent to those skilled in the art that a plurality of steps in excess of two may be employed.

Another object is to provide a mechanical seal assembly in accordance with the foregoing adapted to be mounted upon a housing having a shaft opening, with a rotary pump or other shaft projecting through the opening, the sealing means including a pair of relatively rotatable and axially shiftable sealing rings, one of which is provided with a relatively broad radial sealing face, and the other of which is provided with a pair of radially spaced relatively narrow sealing faces disposed in sealing relation to the relatively broad faces; means being provided for directing fluid at a predetermined pressure, fractionally less than the pressure in the housing, to the space between the relatively narrow faces so as to partially balance pressure across the narrow sealing face which is exposed to housing pressure, the remaining pressure being sealed across the other relatively narrow face.

In accordance with the next preceding objective, it is a further object to provide means communicating with the housing and with the space between the relatively narrow sealing faces aforesaid, including a conduit having means for effecting a drop in the pressure of fluid flowing through the conduit from housing pressure to a lesser pressure, say, on the order of one-half of housing pressure in a two-step seal. The means for effecting the pressure drop may derive from a conduit having a restricted orifice therethrough, as is well known in the art, or the conduit may be in the form of a control tube wherein a given length of tubing, having a passage therethrough of a given size, will effect due to friction a predetermined drop in the pressure of fluid flowing through the tube, as is also well known. Means are also provided for discharging the balancing fluid from the space between the relatively narrow faces, and preferably such means comprise a second conduit having means for reducing the pressure of fluid flowing therethrough from the intermediate balancing pressure to atmospheric pressure, with a total fluid flow at the discharge end of the discharge conduit at a nominal rate, such as one-half gallon per minute, more or less.

Specifically, another object of the invention is to provide a mechanical seal assembly including an adapter flange of annular form, adapted to be secured to a face of a pump or other housing having a rotary shaft extending therethrough, the housing having a shaft opening, such as a conventional stuffing box, of a size larger than the shaft so as to accommodate certain of the seal elements in lieu of conventional packing rings as employed in conventional stuffing boxes for example. A rotating seal element is adapted to be mounted upon the shaft for rotation therewith and for axial movement thereon, means being provided for biasing the rotating seal ring axially in one direction. A non-rotating seal ring is carried by the flange between a central opening through the flange and the shaft, this non-rotating seal ring being provided with a pair of radially spaced relatively narrow seal faces as aforementioned disposed in sealing relation to a relatively broad sealing face on the rotating seal ring, and the flange being provided with inlet and outlet passages, whereby a balancing fluid may be directed to the space between the relatively narrow faces through inlet and outlet passages formed in the body of the non-rotating seal ring.

Other objects and advantages of the invention will be hereinafter described or will become apparent to those skilled in the art, and the novel features thereof will be defined in the appended claims.

In the accompanying drawings.

Like reference characters in the several figures of the drawings and in the following description designate corresponding parts.

Figure 1:
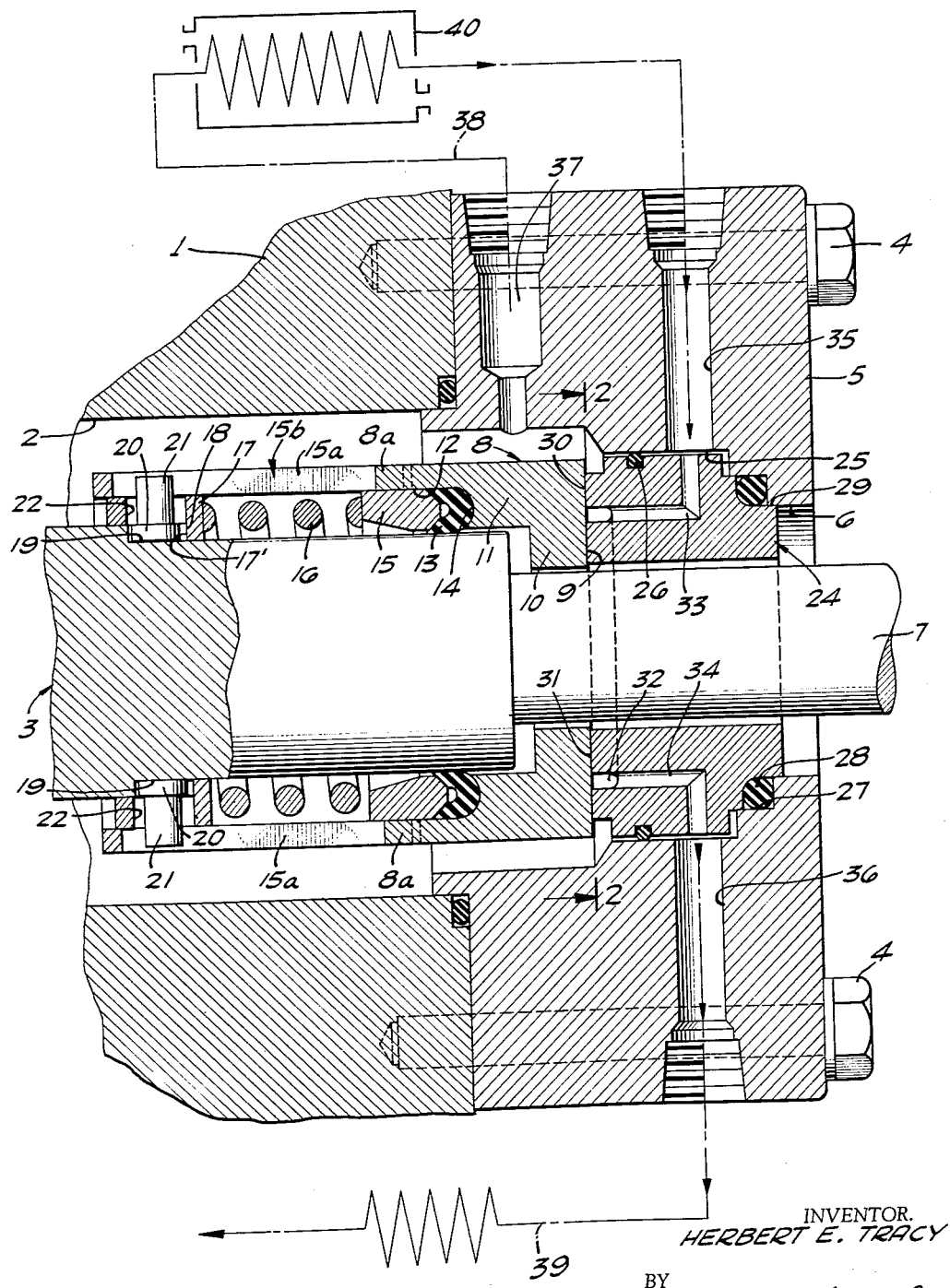
FIGURE 1 is a view in section taken axially of a mechanical seal assembly embodying the invention with certain of the parts shown in elevation.
Figure 2:
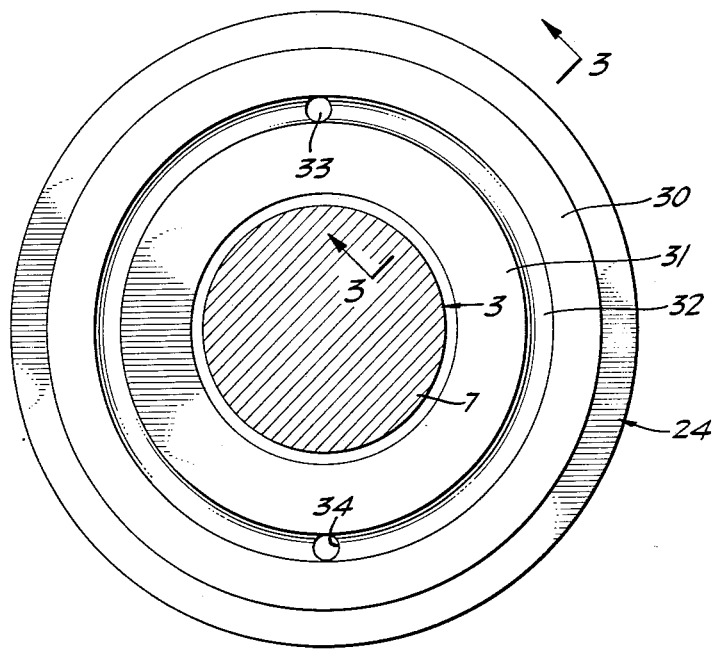
FIGURE 2 is a view in transverse section on an enlarged scale as taken on the line 2—2 of FIG. 1, particularly showing the non-rotating seal ring in elevation.
Figure 3:
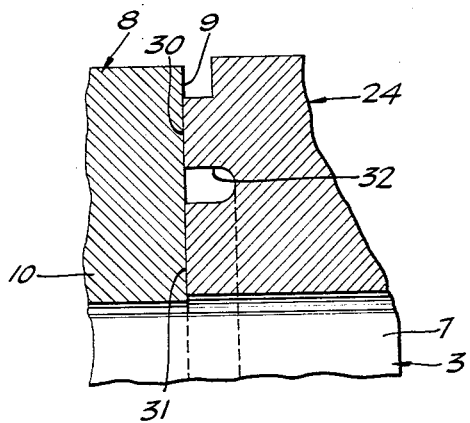
FIGURE 3 is a fragmentary view in section as taken on the line 3—3 of FIG. 2.

Referring to FIG. 1, a pump or other housing is shown at 1, this housing having a shaft opening or stuffing box 2 through which extends a rotary shaft 3. Secured to the outer face of the housing 1, as by means of a suitable number of screws 4, is an annular seal flange 5 having a central opening 6 through which a reduced diameter portion 7 of the shaft 3 extends.

A rotating seal element 8 is disposed about the shaft 3 and is provided with a relatively broad radially extended sealing face 9. The face 9 is formed on a radially enlarged end 10 of the sealing ring 8 which encircles the reduced diameter portion 7 of the shaft 3, the seal ring 8 having an elongated body section 11 extending axially along the main shaft section.

A counterbore 12 in the body 11 of the seal ring 8 provides an annular space between the body 11 and the shaft, in which is disposed a U-cup packing 13 which is pressed into seating contact with a seat 14 and expanded into engagement with the shaft 3 and with the inner periphery of the seal ring 8 as by means of a wedge-like expander 15.

A coiled spring 16 is engaged at one end with the expander 15, and at the other end with a bushing 17 having a shoulder 17' which is in abutting engagement with a shoulder 18 formed on the shaft 3, so that the spring 16 normally biases rotating seal ring 8 axially in the direction of the seal flange 5.

The seal ring 8 has a suitable number of axially extended drive lugs 8a projecting into overlying relation to the expander 15 with slots 15a formed in the outer periphery of the expander 15. Leading axially from the shoulder 18 on the shaft 3 is a plurality of slots 19 in which are disposed the heads 20 of a like number of drive pins 21, these pins projecting radially through openings 22 in the bushing 17 and into elongated slots 15a previously referred to, which extend axially in a skirt 15b on the expander 15 so that the seal ring 8 is keyed to the shaft 3 through pins 21, expander skirt 15b and lugs 8a for rotation therewith but is free for axial movement thereon.

The structure thus far described is well known, and in conventional mechanical seals comprising this structure, a non-rotating seal ring has been employed in cooperative sealing relation to the face 9 of the rotating seal ring 8 and operatively connected to the flange and thus to the housing so as to be non-rotating. However, when such previous seal constructions were subjected to relatively high pressures across the sealing faces of the relatively rotating seal rings, the axial component of force imparted to the axially movable ring has forced the seal faces into intimate contact and has prevented the flow thereacross of a lubricating film of the fluid being sealed, thus resulting in scoring and destruction of the seal faces which, in practice, are lapped to an optically flat finish. In accordance with the present invention this difficulty, as encountered with previously known seals in high pressure installations, is avoided. In order to accomplish this, the novel non-rotating seal ring 24 of the invention is carried by the flange 5 in the central opening 6 therethrough.

Interposed in a groove about the outer periphery of the seal ring 24 within an enlarged counterbore 25 in the flange 5, is an O-ring seal 26. The flange 5 is also provided with a smaller diameter counterbore 27 providing an annular seat for a second O-ring or other seal 28 disposed about a reduced axial extension 29 of the ring 24. The seals 26 and 28 prevent the flow of fluid under pressure from the housing shaft opening or stuffing box 2 between the seal ring 24 and the flange 5, while the packing ring 13, previously described, will prevent the passage of fluid from the housing between the shaft and the rotating seal ring 8.

On the inner end of the non-rotating ring 24 there is an outer relatively narrow radially extended seal face 30, and spaced radially inwardly therefrom, a second relatively narrow radially extended seal face 31. These faces 30 and 31, being disposed in sealing relation to the broad seal face 9 of the ring 8, will effectively provide a mechanical seal for preventing the free flow of fluid from the housing between the seal rings and through the flange opening 6.

An annular space 32 is formed between the relatively narrow seal faces 30 and 31 of the ring 24, and means are provided for conducting fluid under pressure to the annular space 32 so that housing fluid pressure imposed across the cooperative mechanical sealing faces will be partially counterbalanced.

In the illustrative embodiment, the seal ring 24 is provided with an inlet passage 33 and an outlet passage 34 respectively, communicating between O-ring seals 26 and 28, with inlet and outlet passages 35 and 36 respectively, formed in the flange 5. Accordingly, fluid passing into the flange inlet passage 35 will flow through passage 33 of the ring 24, through annulus 32, outlet passage 34 of the ring 24, and will pass out of the flange 5 through flange outlet passage 36.

In accordance with the objectives of the present invention, fluid will be admitted to the annulus 32 at a pressure which is intermediate the housing fluid pressure at the outer periphery of the cooperative seal rings and atmospheric pressure at the inner periphery of the cooperative seal rings.

As shown in the illustrative embodiment, the flange 5 is provided with an outlet passage 37 adapted to conduct fluid to a conduit which is diagrammatically shown and designated at 38. This conduit 38 establishes communication between the interior of the housing and the flange inlet passage 35 previously referred to. The conduit 38 is preferably in the form of a control tube such as is well known and which by virtue of the restriction of fluid flow therethrough, will effect the reduction in pressure of the fluid flowing from the housing through the conduit 38 and into the annulus 32 of seal ring 24.

At the discharge side of the fluid circuit through the seal ring 24, a second conduit 39, shown diagrammatically, is connected to the outlet passage 36 of flange 5, and this conduit 39 is also preferably in the nature of a control tube, or other device for breaking down the pressure of fluid from the annulus 32 such that at the discharge end of conduit 39 pressure is reduced to atmospheric pressure at a minimum rate of flow, for instance, on the order of a few drops per minute, more or less.

If desired, the conduit or control tube 38 may pass through a heat exchanger jacket 40 for cooling the balancing fluid passing therethrough in those applications where high temperatures are a problem in addition to high pressures.

In the operation of the seal hereof, and assuming that fluid in the shaft opening or stuffing box 2 of the housing 1 is at a pressure of 2,000 p.s.i., then there will be a pressure of 2,000 p.s.i. at the outer periphery of seal face 30 and ring 24, and assuming that the conduit or control tube 38 will effect a drop in housing fluid pressure from 2,000 p.s.i. to 1,000 p.s.i. in the annulus 32, then one-half of housing fluid pressure will be balanced across outer seal face 30, and inner seal face 31 will be required to seal only 1,000 p.s.i. It is well recognized in the field that mechanical seal elements are well suited to effective sealing for long periods of time where the differential pressure across the faces is on the order of 1,000 p.s.i. to 1,500 p.s.i., more or less, and since each seal face 30 and 31 is required, in the above illustrative example, to seal only 1,000 lbs., then the seal will function effectively.

In the event, for further example, housing pressure is 3,000 p.s.i., then conduit 38 will reduce the pressure of fluid flowing to annulus 32 to approximately 1,500 p.s.i. Thus, there will be a pressure differential across both sealing faces 30 and 31 of 1,500 p.s.i.; that is, from 3,000 p.s.i. to 1,500 p.s.i. across face 30 and from 1,500 p.s.i. to atmosphere across face 31.

Since the volume of annulus 32 is large in contrast to the volume of fluid passing between seal faces 30 and 9, it will be understood that there will be no significant effect on the pressure which must be sealed across sealing faces 31 and 9.

In furtherance of the invention, the annulus 32 is preferably so disposed in the ring 24 that the respective relatively narrow sealing faces 30 and 31 are of the same area, so that the annulus 32 will be located at the point between the seal faces 30 and 31 where in ordinary operation it would be expected that the mid-point of the pressure gradient across the cooperative seal faces of the rings 8 and 24 will be located.

It will be apparent from the foregoing that in its broader aspects the present invention contemplates what may be characterized as a multi-step seal. A two-step seal is specifically illustrated but it should be understood that additonal steps may be provided without departing from the spirit of the invention so that even higher pressures may be effectively sealed. Moreover, it will be understood that the reference hereinabove to specific pressures is illustrative only, and the seal of the invention may be employed in any application where it might be desirable to partially balance the pressure acting across the seal faces.

Changes and alterations in the structure as specifically shown may be resorted to without departing from the invention, as defined in the appended claims.

I claim:

1. A seal comprising, a housing having a shaft opening, a shaft extending through said opening, mechanical sealing means interposed in the shaft opening between said housing and said shaft for sealing the opening against leakage of fluid under pressure therefrom, said sealing means including a ring connected to said shaft for rotation therewith and a relatively stationary ring operatively connected to said housing, said rotatable ring having a relatively broad radial sealing face, said stationary ring having a pair of relatively narrow radially spaced sealing faces disposed in sealing relation to said broad face and defining an annular space, said stationary ring also having fluid inlet and outlet passages in direct communication with said annular space between said relatively narrow faces, means including a pressure reducer for directing fluid under pressure to said inlet passage from said housing at a pressure intermediate housing pressure and atmosphere, and means for directing said fluid away from said outlet passage.

2. A seal comprising, a housing having a shaft opening, a shaft extending through said opening, mechanical sealing means interposed in the shaft opening between said housing and said shaft for sealing the opening against leakage of fluid under pressure therefrom, said sealing means including a ring connected to said shaft for rotation therewith and a relatively stationary ring operatively connected to said housing, said rotatable ring having a relatively broad radial sealing face, said stationary ring having a pair of relatively narrow radially spaced sealing faces disposed in sealing relation to said broad face, said stationary ring also having fluid inlet and outlet passages communicating with the space between said relatively narrow faces, means defining a flow passage establishing communication between said housing and said inlet passage, said last-mentioned means including means for reducing the pressure of the fluid passing therethrough, and means for directing fluid away from said space between said relatively narrow faces.

3. In a seal comprising, a housing having a shaft opening, a shaft extending through said opening, mechanical sealing ring means operatively connected to said shaft and to said housing for sealing the opening against the passage of fluid under pressure from said housing, said ring means being subjected to housing pressure at one periphery and to atmosphere at the other periphery, the improvement wherein said ring means are provided with a relatively broad radial sealing face and a pair of relatively narrow radial sealing faces disposed in radially spaced relation and in sealing relation to said broad face, and including means for directing fluid pressure to the space between said narrow faces at a value between housing pressure and atmospheric pressure for partially balancing housing pressure across one of said narrow faces, means in direct communication with said space for discharging fluid from said space between said narrow faces, said means for directing fluid pressure to the space between the narrow faces including a conduit communicating with the housing and having means for effecting a fractional reduction of housing fluid pressure.

4. In a seal comprising, a housing having a shaft opening, a shaft extending through said opening, mechanical sealing ring means operatively connected to said shaft and to said housing for sealing the opening against the passage of fluid under pressure from said housing, said ring means being subjected to housing pressure at one periphery and to atmosphere at the other periphery, the improvement wherein said ring means are provided with a relatively broad radial sealing face and a pair of relatively narrow radial sealing faces disposed in radially spaced relation and in sealing relation to said broad face, and including means for directing fluid pressure to the space between said narrow faces at a value between housing pressure and atmospheric pressure for partially balancing housing pressure across one of said narrow faces, means in direct communication with said space for discharging fluid from said space between said narrow faces, said means for discharging fluid from the space between said narrow faces including a conduit having means for effecting a reduction of pressure of the discharge fluid to atmospheric pressure.

5. In a seal comprising, a housing having a shaft opening, a shaft extending through said opening, mechanical sealing ring means operatively connected to said shaft and to said housing for sealing the opening against the passage of fluid under pressure from said housing, said ring means being subjected to housing pressure at one periphery and to atmosphere at the other periphery, the improvement wherein said ring means are provided with a relatively broad radial sealing face and a pair of relatively narrow radial sealing faces disposed in radially spaced relation and in sealing relation to said broad face, and including means for directing fluid pressure to the space between said narrow faces at a value between housing pressure and atmospheric pressure for partially balancing housing pressure across one of said narrow faces, means in direct communication with said space for discharging fluid from said space between said narrow faces, said means for directing fluid pressure to the space between the narrow faces including a conduit communicating with the housing and having means for effecting a fractional reduction of housing fluid pressure and the means for discharging fluid from the space between said narrow faces including a conduit having means for effecting a reduction of pressure of the discharge fluid to atmospheric pressure.

6. In a seal comprising, a housing having a shaft opening, a shaft extending through said opening, mechanical sealing ring means operatively connected to said shaft and to said housing for sealing the opening against the passage of fluid under pressure from said housing, said ring means being subjected to housing pressure at one periphery and to atmosphere at the other periphery, the improvement wherein said ring means are provided with a relatively broad radial sealing face and a pair of relatively narrow radial sealing faces disposed in radially spaced relation and in sealing relation to said broad face, and including means for directing fluid pressure to the space between said narrow faces at a value between housing pressure and atmospheric pressure for partially balancing housing pressure across one of said narrow faces, means in direct communication with said space for discharging fluid from said space between said narrow faces, said relatively narrow faces being of substantially equal areas, the means for directing fluid pressure to the space between the narrow faces including a conduit communicating with the housing and having means for reducing the pressure of fluid flowing from the housing to approximately one half of housing fluid pressure.

7. A seal assembly comprising, a seal flange adapted to be mounted on a housing about a shaft projecting from the housing, said shaft having a mechanical seal ring mounted thereon for rotation therewith, said seal ring having a relatively broad radially extended sealing face, non-rotatable sealing ring means carried by said flange including a pair of radially spaced ring portions having radially extended relatively narrow sealing faces disposed in sealing relation to said relatively broad face, said ring portions defining an annulus therebetween, said non-rotating sealing ring means also having fluid inlet and outlet passages in direct communication with said annulus, means including a pressure reducer communicating with said inlet passage for supplying fluid to said annulus from said housing at a pressure intermediate the pressure being sealed in the housing and atmosphere, and discharge means communicating with said outlet passage.

8. A seal assembly as defined in claim 7, wherein the means communicating with said inlet passage comprises a conduit adapted to communicate with said housing and having means for effecting a fractional reduction of fluid pressure from housing fluid pressure to said intermediate pressure.

9. A seal assembly as defined in claim 7, wherein the means communicating with said inlet passage comprises a conduit adapted to communicate with said housing and having means for effecting a fractional reduction of fluid pressure from housing fluid pressure to said intermediate pressure, and said discharge means comprising a conduit having means for effecting further reduction of the pressure of fluid discharged from said annulus.

10. A seal assembly as defined in claim 8, wherein the means communicating with said inlet passage comprises a control tube adjusted to communicate with said housing and having a restricted passageway for effecting a fractional reduction of fluid pressure from housing fluid pressure to said intermediate pressure.

11. A seal assembly as defined in claim 7, wherein said discharge means comprise a control tube discharging to atmosphere for reducing fluid pressure from said intermediate pressure to atmospheric pressure.

References Cited in the file of this patent

UNITED STATES PATENTS

| | | |
|---|---|---|
| 1,315,822 | Doran | Sept. 9, 1919 |
| 2,032,403 | Smittle | Mar. 10, 1936 |
| 2,122,560 | De Florez | July 5, 1939 |
| 2,679,412 | Whitfield | May 25, 1954 |
| 2,824,759 | Tracy | Feb. 25, 1958 |